United States Patent
Snider

(10) Patent No.: US 7,248,592 B1
(45) Date of Patent: Jul. 24, 2007

(54) PARTITIONABLE DATA FABRIC AND COMPUTING ARRANGEMENT

(75) Inventor: Gregory S. Snider, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1085 days.

(21) Appl. No.: 10/219,028

(22) Filed: Aug. 14, 2002

(51) Int. Cl.
H04L 12/28 (2006.01)

(52) U.S. Cl. ........................ 370/401; 370/400; 370/466

(58) Field of Classification Search ...................... None
See application file for complete search history.

(56) References Cited

U.S. PATENT DOCUMENTS

| | | | |
|---|---|---|---|
| 6,425,034 B1 * | 7/2002 | Steinmetz et al. | 710/305 |
| 6,539,024 B1 * | 3/2003 | Janoska et al. | 370/412 |
| 7,082,132 B1 * | 7/2006 | Beshai et al. | 370/391 |
| 2003/0202510 A1 * | 10/2003 | Witkowski et al. | 370/386 |
| 2004/0006725 A1 * | 1/2004 | Lakshmanamurthy et al. | 714/42 |

OTHER PUBLICATIONS

I. Keslassy, N. McKeown, "Maintaining Packet Order in Two-stage Switches", Computer Systems Laboratory, Stanford University.

* cited by examiner

Primary Examiner—Duc Ho

(57) ABSTRACT

A circuit arrangement and method for interfacing a node and a data fabric. In a computing arrangement that includes a plurality of nodes intercoupled by the data fabric, each node is assigned to one of a plurality of partitions. A node-interface circuit is configured to interface with the source node, and a translation circuit translates data between a first format compatible with the nodes and a second format compatible with the data fabric. An access control circuit either enables or disables transmission of data from the source node based on whether the source and destination nodes are in the same partition.

8 Claims, 3 Drawing Sheets

PARTITIONABLE DATA FABRIC AND COMPUTING ARRANGEMENT

FIELD OF THE INVENTION

The present invention generally relates to data fabrics, and more particularly to a data fabric and interface that supports partitioning of the data fabric.

BACKGROUND

A data fabric is a communication network designed to interconnect large numbers of computation nodes such that the nodes can exchange data with high bandwidth and low latency. The fabric generally allows any-to-any connectivity between nodes. Data fabrics have evolved from simple shared-bus implementations, with serialized data transfers, to switched implementations, which provide highly-concurrent, high bandwidth communication between may processing nodes.

Two example applications of data fabrics include a clustered supercomputer arrangement and an Internet data center. A clustered supercomputer arrangement includes hundreds or thousands of processors and storage elements that are interconnected via the data fabric. The storage elements combine to form a single, global address space. Similarly, an Internet data center includes hundreds or thousands of processing nodes, storage elements, load distribution nodes, firewalls and other components interconnected by a data fabric. By configuring the data fabric the components can be divided (or "partitioned") into isolated domains (or "partitions"), with each partition serving a different customer, for example.

Fabrics are currently partitioned through software-controlled configuration of switches within the fabric. The configuration software tends to be large and complex, which may lead to an increased likelihood of program bugs. Furthermore, the switch topology must be known to the configuration software in order for the configuration software to function correctly. If the topology is changed, which is likely in a typical data center as new switches and nodes are added over time, the configuration software must be kept strictly in sync with the hardware topology. Otherwise, the chances of a security lapse are greatly increased.

A system and method that address the aforementioned problems, as well as other related problems, are therefore desirable.

SUMMARY OF THE INVENTION

In various embodiments, the invention provides a circuit arrangement and method for interfacing a node and a data fabric. In a computing arrangement that includes a plurality of nodes intercoupled by the data fabric, each node is assigned to one of a plurality of partitions. A node-interface circuit is configured to interface with the source node, and a translation circuit translates data between a first format compatible with the nodes and a second format compatible with the data fabric. An access control circuit either enables or disables transmission of data from the source node based on whether the source and destination nodes are in the same partition.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments of the invention, a line card provides an interface between a node and a data fabric. Each node has a dedicated line card, which is configurable to control with which nodes the connected node can communicate via the data fabric. The various embodiments provide hardware-level control over communication via a partitioned data fabric without requiring complex software that accounts for the data fabric topology.

Figure 1:
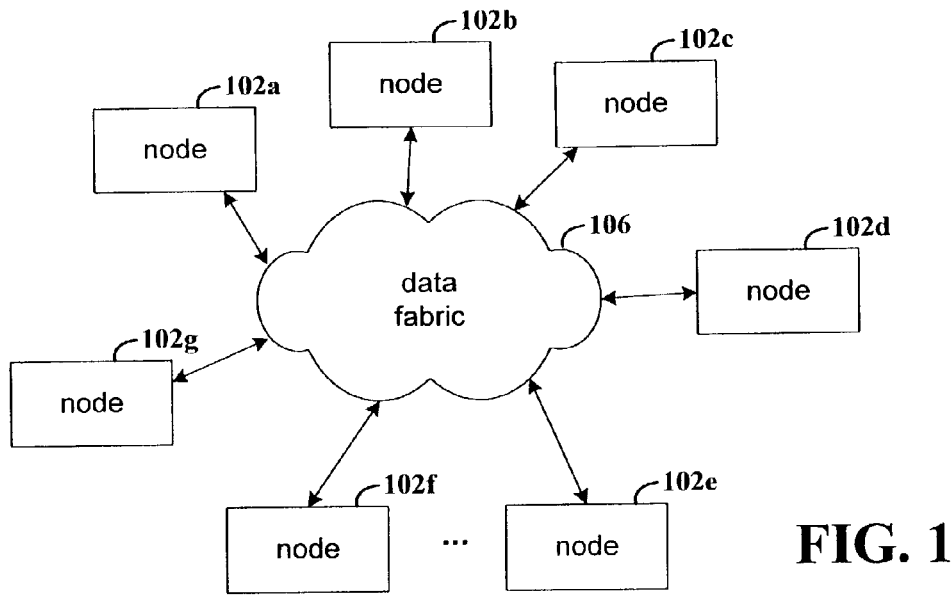
FIG. 1 illustrates a computing arrangement in which computing nodes are intercoupled via a data fabric.

FIG. 1 illustrates an example computing arrangement in which nodes 102a–102g are intercoupled via a data fabric 106. The software executing on each of the nodes and the type of hardware that implements each node depends on the application. For example, some nodes may be configured to execute application logic, some nodes configured for storage functions, and other nodes configured for security functions. The geographic dispersal of the nodes also depends on the application. For example, in a supercomputer cluster the nodes may be in the same room, whereas in an another application the nodes may be separated from central switch by more than a hundred meters. The application also dictates the capabilities and configuration of the data fabric. For example, typical capabilities include any-to-any and non-blocking connectivity between nodes.

The desired attributes of a typical data fabric are high bandwidth and low latency, independence from higher level protocols (e.g., IP, RDMA, SCI, etc.), and partitioning into independent non-interacting domains. A high degree of assurance that communication between nodes in different domains via the data fabric is not achievable is also desirable. For example, if the computing arrangement is partitioned such that nodes 102a, 102e, and 102f are in a first partition, nodes 102b and 102g are in a second partition, and nodes 102c and 102d are in a third partition, then nodes in the first partition are not allowed to communicate with nodes in either the second or third partition via the data fabric. The present invention provides hardware level control over the partition security and software level flexibility in defining the partitions.

Figure 2:
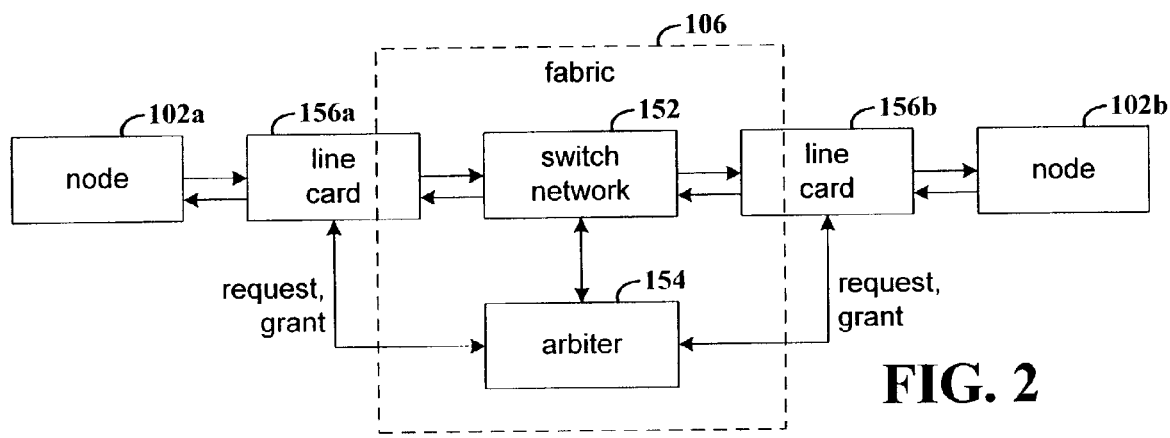
FIG. 2 is a functional block diagram of components that couple computing nodes to the data fabric.

FIG. 2 is a functional block diagram of components that couple two nodes to the data fabric. A typical implementation of a data fabric 106 includes a switch network 152 and arbitration hardware (arbiter 154). Individual nodes 102a and 102b interface to the fabric via line cards 156a and 156b, respectively. It will be appreciated that additional nodes may be coupled to the switch network and arbiter if required by the computing environment. A line card is responsible for transforming higher level messages, for example, IP packets, into fixed size cells for the data fabric and from incoming cells to higher level messages. The line card also buffers the cells for transmission over the data fabric. In an example implementation, the switch network provides any-to-any connections between nodes as well as non-blocking connectivity. It will be appreciated that there are numerous known switch network implementations, each with its own advantages and disadvantages.

The arbiter 154 receives cell transmission requests from each of the line cards and grants each card permission to transmit particular cells to the switch network 152. Depending on the nature of the switch network, the arbitration technique employed by the arbiter can range from simple to complex. For example, the arbiter may implement either the iSLIP or Full Frames algorithms.

Figure 3:
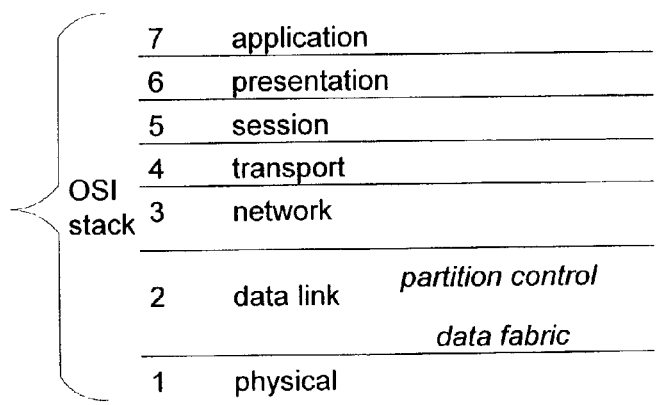
FIG. 3 illustrates the Open Systems Interconnect (OSI) reference model for communication protocols.

FIG. 3 illustrates the Open Systems Interconnect (OSI) reference model for communication protocols. The 7 layers of the model are sometimes are sometimes referred to as the "OSI stack." Briefly, the physical layer is responsible for the physical aspects of the transmission of data, for example, the electrical and mechanical connections. The data link layer manages the low level frames or fixed-size packets, detects errors, and is responsible for the correct delivery of data. The network layer sets up the connection between nodes and routes the packets. The transport layer manages the end-to-end control (for example, determining whether all packets have arrived) and error-checking. The session layer sets up, coordinates, and terminates conversations, exchanges, and dialogs between the applications at each end. The presentation layer converts incoming and outgoing data from one presentation format to another. The application layer is the layer at which communication partners are identified, quality of service is identified, user authentication and privacy are considered, and any constraints on data syntax are identified.

The data fabric is implemented at the data link layer. In one embodiment of the invention, the partition control is implemented between the data link layer (layer 2) and the network layer (layer 3) in the OSI stack. This isolates the partition control from the particular requirements of protocols at the higher layers (3 and above), which means that the same partition control mechanism can be used for all the layers above the data link layer.

Figure 4:
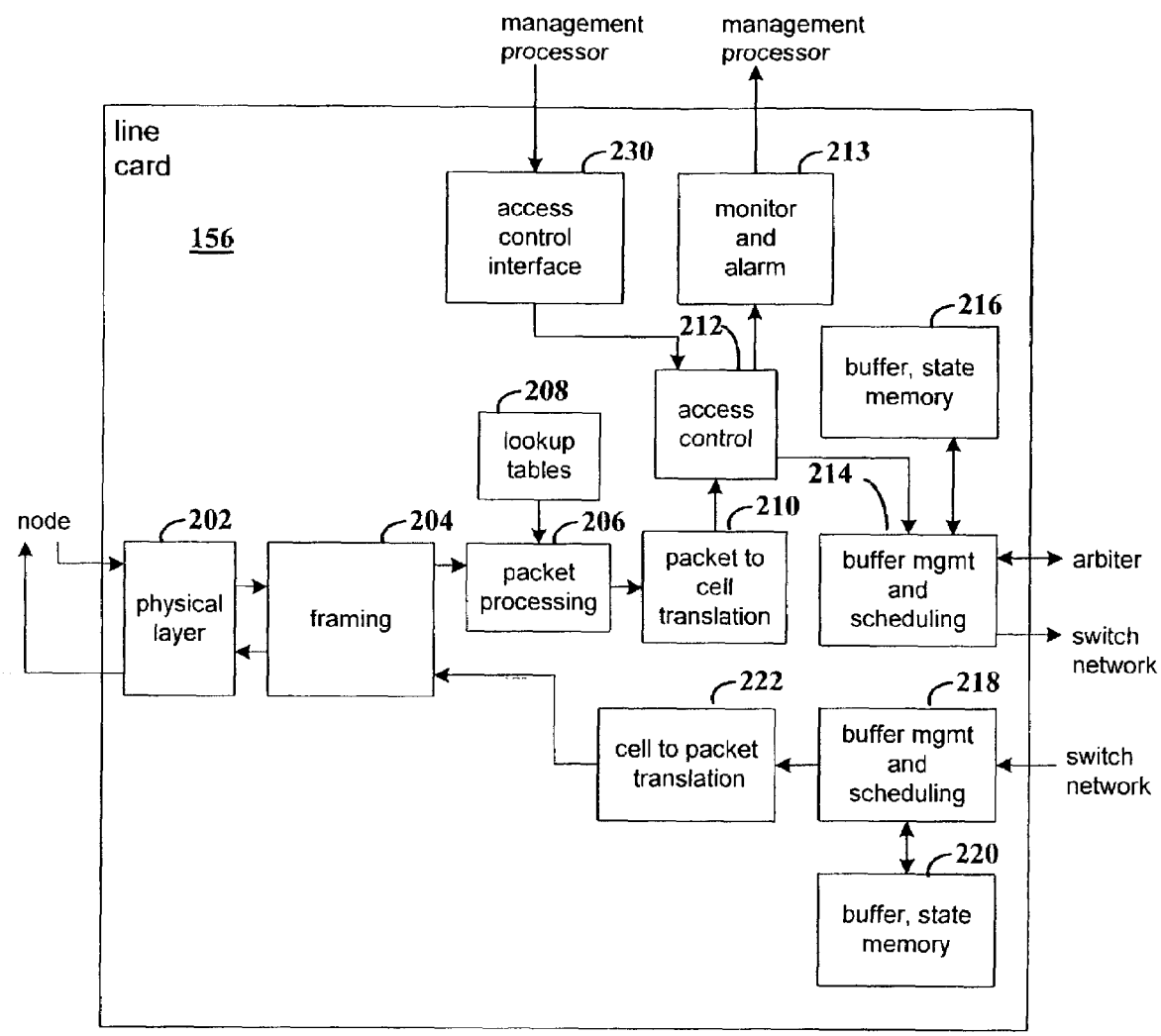
FIG. 4 is a functional block diagram that illustrates an example line card in accordance with one embodiment of the invention.

FIG. 4 is a functional block diagram that illustrates an example line card in accordance with one embodiment of the invention. The line card 156 generally provides the interface between a node and the data fabric. In accordance with one embodiment of the present invention, partition control is implemented in the line card. That is, a line card connected to one of the nodes controls communication between the node and the other nodes according to the partitions of the data fabric.

Most of the components of example line card 156 are illustrative of those components found in conventional line cards. For example, a physical layer component 202 is coupled to the associated node and provides the signal-level interface between the node and the line card. The framing component 204 extracts the structure of the bit stream in order to establish synchronization with the sender/receiver.

Outgoing packets are provided to the packet processing component 206, which uses lookup tables 208 to translate layer 3 addresses, for example, IP addresses, to layer 2 addresses, for example, another node coupled to the data fabric. The packets are then translated into cells for the data fabric by the packet-to-cell translation component 210. The access control component 212 determines whether the source node is in the same partition as the destination node. If so, the cells are provided to the buffer scheduling and management component 214, which first obtains authorization from the arbiter before transmitting the cells over the data fabric. If a transmission attempts to send data to a node in another partition, access control 212 signals the monitor and alarm component 215. The monitor and alarm component alerts a management processor (not shown) of attempted transmissions that are in violation of the partition definitions. The buffer and state memory component 216 is used by the buffer management for temporary storage of cells and tracking transmissions states of cells.

Incoming cells are received by buffer management and scheduling component 218, which uses memory 220 to temporarily store the cells and maintain state information. The cells are provided by cell-to-packet translation component 222, which converts the cells to packet formation and provides the packet to framing component 204.

In one embodiment, the access control component 212 is configurable via the access control interface 230, which is coupled to a management processor. The access control interface provides the interface between the configurable bits of the access control component and the management processor. For example, the management processor is coupled to the access control interfaces of the all the line cards of all the nodes by a secure local area network. The access control interface includes the logic needed to communicate with the management processor over the network and configure the access control component. In an example embodiment, the access control, monitor and alarm, and access control interface components are implemented with programmable logic, such an FPGA. Those skilled in the art will appreciate that other components of the line card may also be implemented in programmable logic, depending on implementation requirements. By implementing in the line card the control over which nodes can communicate over the data fabric, the partitioning is enforced by hardware, not software, thereby making the mechanism less susceptible to unauthorized access. Furthermore, with the access control implemented in the line cards, the fabric topology does not affect the security provided by the access control. That is, the data fabric can be extended or changed as long as management processor configures the line cards with the correct security policy governing communication between nodes.

Figure 5:
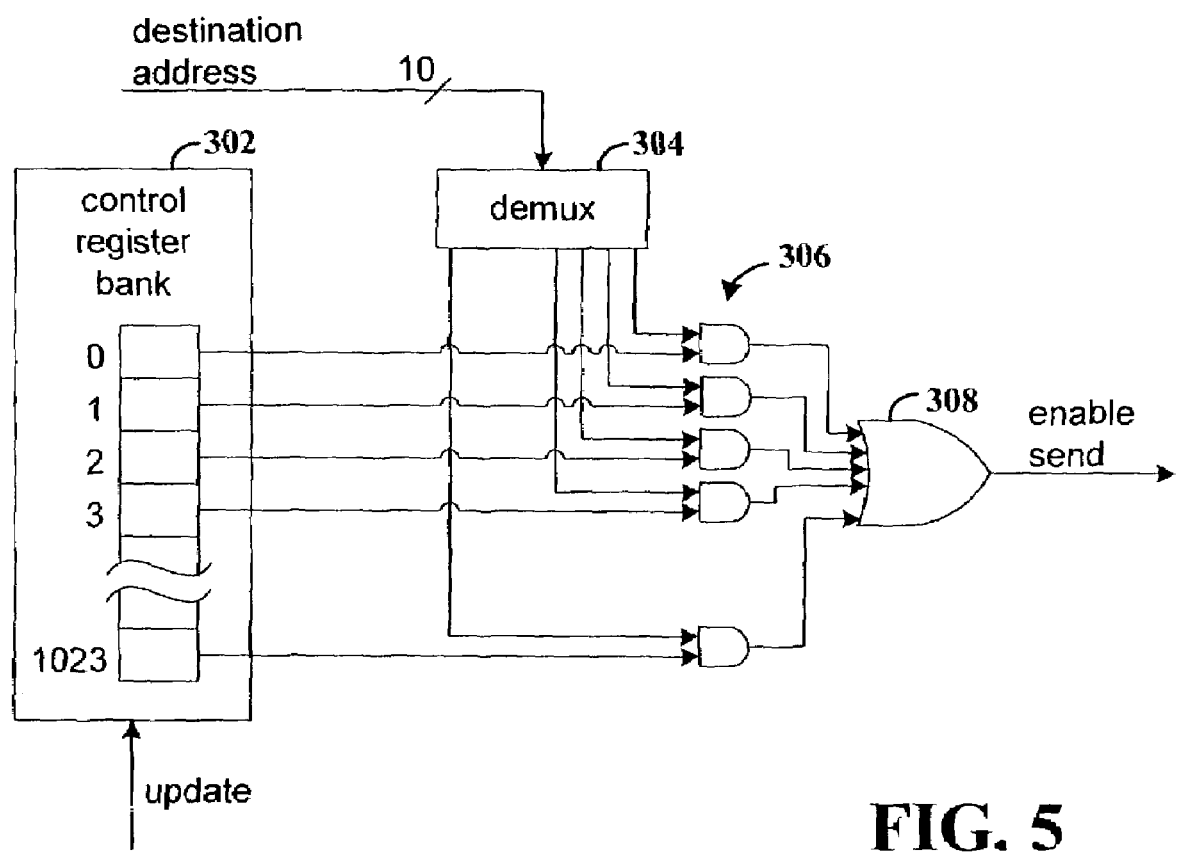
FIG. 5 illustrates example logic that implements partition access control for computing nodes coupled to the data fabric.

FIG. 5 illustrates example logic that implements partition access control for computing nodes coupled to the data fabric. The example logic circuit is implemented in each line card and selectively enables sending of data via the data fabric. The control register bank 302 includes configurable bits of storage associated with the other nodes coupled to the data fabric. The state of a bit indicates whether the node of the line card is in the same partition as the node associated with the bit. It will be appreciated that the register control bank would have bits with a 0 state associated with ports of the data fabric that do not have connected nodes.

In the example embodiment, each node connected to the data fabric is assigned a number. For example, in a data fabric with 1024 ports, each node is assigned a value of 0–1023. Thus, in transmitting data between nodes via the data fabric, 10 bits are needed to address the nodes. The destination address is input to demultiplexer 304, which activates a signal on one of 1024 output lines based on the input address. The output signals from the demultiplexer are input to respective AND gates 306, along with output signals from corresponding bits in the control register bank. Thus, when a node is addressed and the state of the configuration bit associated with the addressed node indicates that the addressed node is in the same partition as the source node, the output from the associated AND gate is logic level 1, which causes the output from OR gate 308 to enable transmission of the data.

The present invention is believed to be applicable to a variety of arrangements for interconnecting computing nodes and has been found to be particularly applicable and beneficial in a partitionable data fabric. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit arrangement for interfacing a node and a data fabric in a computing arrangement that includes a plurality of nodes intercoupled by the data fabric, wherein each node is assigned to one of a plurality of partitions, and the node from which data are sent is a source node and the node to which data are sent is a destination node, comprising:
    a node-interface circuit configured to interface with the source node;
    a translation circuit coupled to the node-interface circuit and configured to translate data between a first format compatible with the nodes and a second format compatible with the data fabric;
    an access control circuit coupled to the translation circuit, the access control circuit configured to enable and disable transmission of data from the source node to a destination node in response to partition assignments of the nodes; and
    a buffer management circuit coupled to the access control circuit and configured to interface with the data fabric.

2. The circuit arrangement of claim 1, wherein the access control circuit is configurable to define partitions of nodes.

3. The circuit arrangement of claim 2, wherein the access control circuit includes a plurality of storage elements for storage of bits of binary data, each bit associated with one of the nodes, and a state of a bit indicating whether the partition of the associated node is the partition of the source node.

4. The circuit arrangement of claim 3, wherein the access control circuit comprises:
    a demultiplexer having input ports coupled to the translation circuit and a plurality of output ports, wherein the translation circuit provides an address of the destination node address to the demultiplexer;
    a plurality of AND logic circuits, each having a first input port coupled to a respective one of the storage elements and a second input port coupled to a respective one of the output ports of the demultiplexer; and
    an OR logic circuit having a plurality of input ports coupled to output ports of the AND logic circuits.

5. A computing arrangement comprising:
    a data fabric;
    a plurality of nodes coupled to the data fabric via respective line cards, wherein each node is assigned to one of a plurality of partitions, and the node from which data are sent is a source node and the node to which data are sent is a destination node, and the line card includes,
    a node-interface circuit configured to interface with the source node;
    a translation circuit coupled to the node-interface circuit and configured to translate data from a first format compatible with the nodes and a second format compatible with the data fabric;
    an access control circuit coupled to the translation circuit, the access control circuit configured to enable and disable transmission of data from the source node to a destination node in response to partition assignments of the nodes; and
    a buffer management circuit coupled to the access control circuit and configured to interface with the data fabric.

6. The computing arrangement of claim 5, wherein the access control circuit is configurable to define partitions of nodes.

7. The computing arrangement of claim 6, wherein the access control circuit includes a plurality of storage elements for storage of bits of binary data, each bit associated with one of the nodes, and a state of a bit indicating whether the partition of the associated node is the partition of the source node.

8. The computing arrangement of claim 7, wherein the access control circuit comprises:
    a demultiplexer having input ports coupled to the translation circuit and a plurality of output ports, wherein the translation circuit provides an address of the destination node address to the demultiplexer;
    a plurality of AND logic circuits, each having a first input port coupled to a respective one of the storage elements and a second input port coupled to a respective one of the output ports of the demultiplexer; and
    an OR logic circuit having a plurality of input ports coupled to output ports of the AND logic circuits.

* * * * *